Sept. 25, 1962 H. C. SMITH ET AL 3,055,981

EMERGENCY REPORTING TELEPHONE SYSTEM

Filed June 13, 1961 2 Sheets-Sheet 1

INVENTOR.
Harrison C. Smith
Werner Jung
BY
C. A. Bullbrandsen
Atty.

INVENTOR.
Harrison C. Smith
Werner Jung
BY C. A. Gulbransen
Atty.

United States Patent Office 3,055,981

Patented Sept. 25, 1962

3,055,981

EMERGENCY REPORTING TELEPHONE SYSTEM

Harrison C. Smith, Wheaton, and Werner Jung, Morton Grove, Ill., assignors to Automatic Electric Laboratories, Inc., Northlake, Ill., a corporation of Delaware Filed June 13, 1961, Ser. No. 116,753
4 Claims. (Cl. 179—5)

This invention relates to telephone systems and more particularly to a telephone hookswitch for use with an emergency reporting telephone system.

Various municipal emergency telephone systems are known, most of which have a primary purpose to serve the public in reporting fires and a secondary purpose to serve as a check-in for policemen to call headquarters. It is important that both purposes be preserved, yet it is equally important that they be distinct and easily available to a particular person desiring to use a telephone.

In a known system a telephone is employed which, immediately as the handset is lifted, connects the caller to the fire station. If a call is to be made to police headquarters, a button on the side-wall of the call box, known only to authorized persons, must be in the depressed position during lifting of the handset to complete a call to the police station rather than the fire station.

It has been found, however, that the location of the button requires the person calling the police to use one hand for depressing the button and the other hand to lift the handset. This occasionally presents a burdensome problem to the policeman if he is controlling a prisoner or the like with one hand.

It is the primary object of this invention, therefore, to provide a telephone hookswitch for use with an emergency reporting telephone system which has a transfer button mounted directly thereon so that the same hand which lifts the handset may be used to depress the transfer button.

It is another object of this invention to provide a transfer button for an emergency reporting telephone which can be locked in the depressed position until the handset is removed.

The invention will be more fully understood from the following detailed description of an embodiment thereof. In the accompanying drawings.

Figures 1, 5:
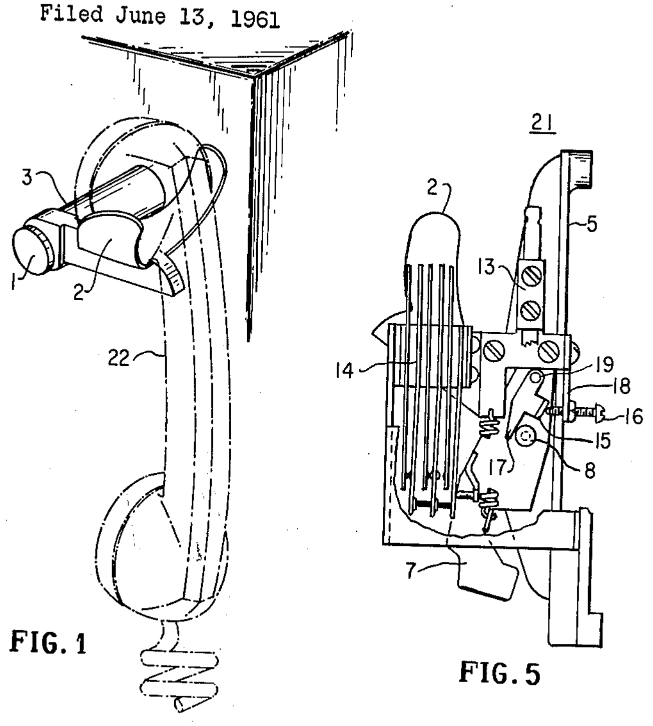
FIG. 1 is a perspective view of the inside of a call box with the handset shown in phantom as it would rest on the hookswitch.
FIG. 5 is a side view of the modification of FIG. 4 except with the hookswitch in the off-hook position, and more fully showing the locking mechanism.
Figure 3:
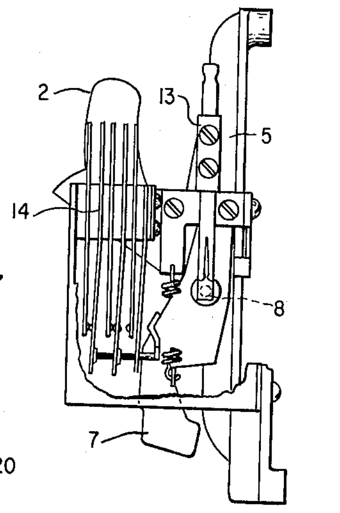
FIG. 3 is a side view of the hookswitch in the off-hook position showing the hookswitch spring pileup and the arm which actuates the pileup.
Figure 2:
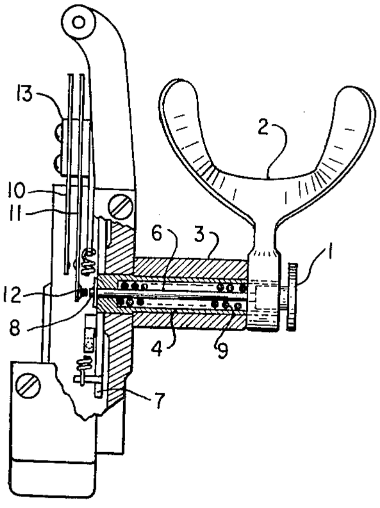
FIG. 2 is a rear view of the hookswitch, partly in section, showing the push button and the transfer spring pileup with the handset off-hook.

Referring now to the drawings, in FIGS. 1, 2, and 3 the hookswitch 21 is shown as having a cradle 2 in which rests a handset 22. Cradle 2 is attached to the outer end of rod 4, which in turn, has an actuating arm 7 on its inner end to actuate the hookswitch spring pileup 14. Rod 4 is rotatable within bearing member 3 which is secured to frame 5 of hookswitch 21. Pin 6 has a push button 1 on its outer end and is resiliently held in its outermost position by spring 9. Transfer spring pileup 13 is positioned on frame 5 such that when push button 1 is depressed, the inner end 8 of pin 6 will strike the armature spring 11 of pileup 13 to operate contact 30 of the pileup. When push button 1 is released, pin 6 is restored to its outermost position by spring 9 and contact 30 of pileup 13 is opened.

Figure 4:
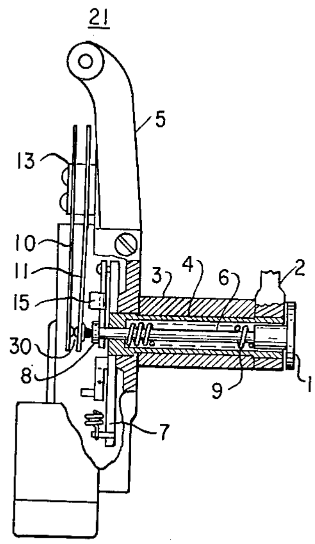
FIG. 4 is a rear view of the hookswitch, partly in section, showing a modification of the invention in which the push button is locked in the depressed position until the handset is removed. The hookswitch is shown in the on-hook position and the push button is locked in the depressed position.
Figure 6:
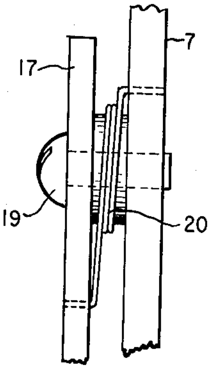
FIG. 6 is a side view of the latching lever and the spring which urges the lever in a counter clockwise direction as viewed in FIG. 5.

A modification of hookswitch 21 is shown in FIGS. 4, 5, and 6, in which push button 1 is locked in its innermost position until the handset 22 is removed. In this modification, a latching lever 17 is pivotally secured to actuating arm 7 by screw 19. Lever 17 is spring biased in a counter clockwise direction (as viewed in FIG. 5) by means of spring 20. An adjustable screw 16, in a bracket 18 attached to frame 5, is adjusted so that it strikes a tab 15 on lever 17 when arm 7 is pivoted forward to actuate hookswitch pileup 14. Lever 17, therefore, is urged against head 8 of pin 6 and if push button 1 is depressed, lever 17 will slip under the edge of head 8 locking transfer spring pileup 13 in its actuated position. However, as soon as handset 22 is lifted from cradle 2, arm 7 pivots forward to actuate hookswitch pileup 14 and tab 15 of lever 17 strikes screw 16 pushing lever 17 away from head 8, thus allowing pin 6 to return to its outermost position restoring transfer pileup 13. The locking modification thus serves to hold transfer spring pileup 13 actuated until a moment after the hookswitch spring pileup 14 is actuated.

Figure 7:
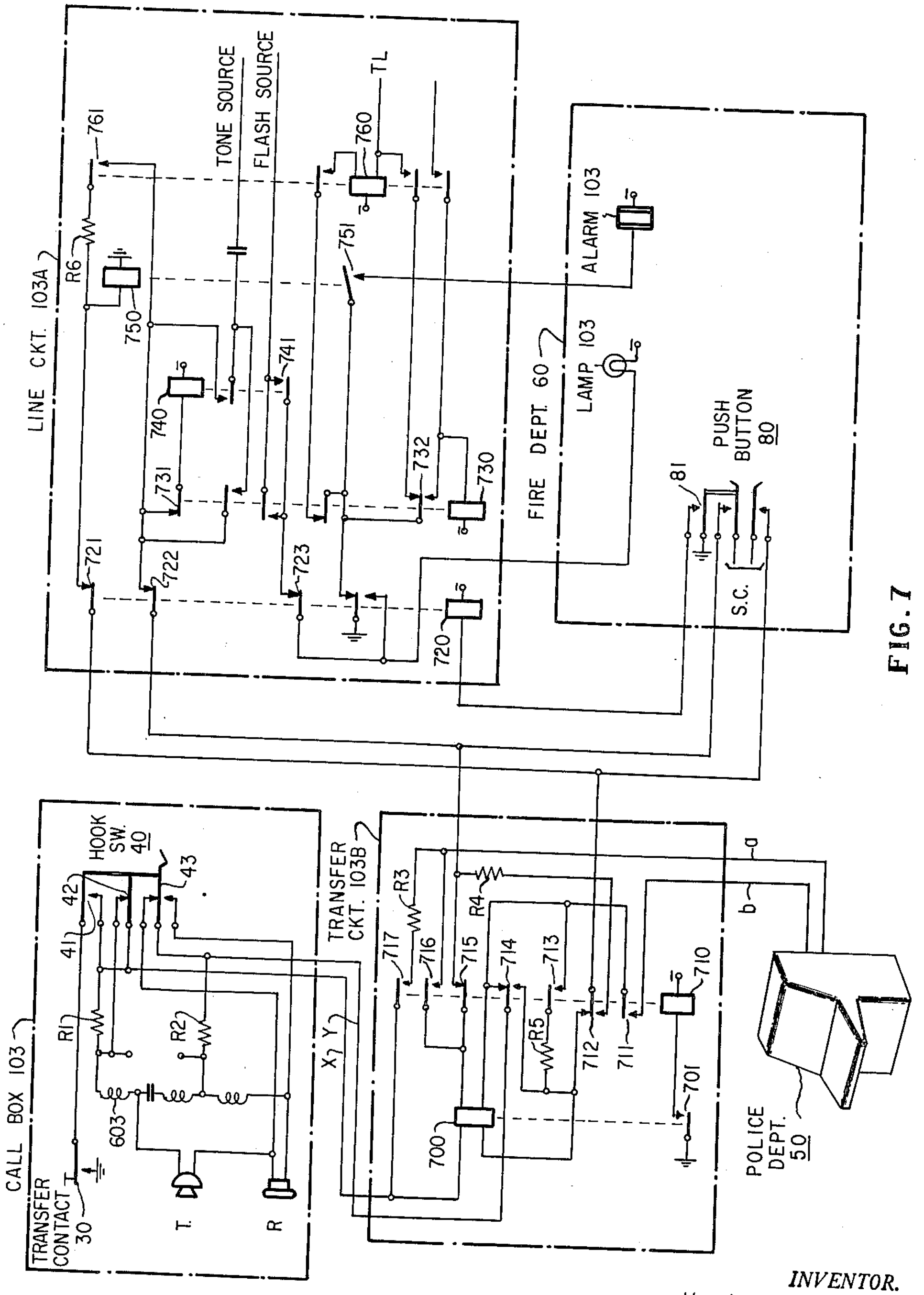
FIG. 7 shows a circuit of an emergency reporting system including one call box and its interconnections with the transfer circuit, line circuit, fire station, and police station.

A typical circuit for an emergency reporting telephone system in which hookswitch 21 may be employed is shown in FIG. 7. The system as shown includes only one call box, number 103, together with its associated line circuit 103A, transfer circuit 103B, and connecting line X, Y. The system also includes fire department switchboard equipment 60 and police department switchboard 50.

With the handset on-hook, continuous supervision of both the loop and the telephone exist by virtue of a circuit from ground through the winding of relay 750, contact 721, contact 712, the number 1 winding of relay 700, contact 714, line conductor Y, resistor $R_2$, the telephone receiver R and transmitter T, the line winding 603 of the induction coil, resistor $R_1$, line conductor X, the number 2 winding of relay 700, contact 715, contact 722, contact 731, through the winding of relay 740 to battery. The resistor $R_1$ limits the current to a value low enough to prevent operation of relay 740 yet permit line supervision by means of normally operated relay 750. If this circuit is opened at any point, relay 750 releases, operating contact 751 to sound alarm 103 in the fire department. A short across the line operates relay 740 and through its contact 741 results in operation of signal lamp number 103 at the fire department from the lead marked "flashing source."

When the handset of call box 103 is lifted operating hookswitch 40, contact 42 shorts resistor $R_1$. A circuit is completed from ground through the winding of relay 750, contact 721, contact 712, the number 1 winding of relay 700, contact 714, line conductor Y, contact 43, the telephone transmitter T, the line winding 603 of the induction coil, contact 42, line conductor X, the number 2 winding of relay 700, contact 715, contact 722, contact 731, the winding of relay 740 to battery.

Relay 740 operates and contact 741 places flashing source through contact 723 to lamp 103 at the fire department. After a 500 millisecond delay precluding false operations by transient shorts or by lightning surges, relay 760 operates from timing lead TL, closing a circuit from ground through the winding of relay 750, resistor $R_6$, contact 761, contact 731, the winding of relay 740, to battery, to lock relay 740 operated, holding the line even though the caller may have hung up. In answering the call the attendant at the fire department depresses button 80 which, at contact 81 operates relay 720 to restore the system to normal. Line SC of button 80 extend to the supervisor's console.

If the caller wishes to make a police call, it is necessary to depress push button 1, see FIGS. 1 and 2, on the hookswitch to actuate transfer contact 30, see FIG. 7. Referring first to the embodiment shown in FIGS. 2 and 3 in which push button 1 is non-locking, the user must hold this push button depressed until the handset has been removed. Thus, for a short period of time, transfer contact 30 is actuated while contact 41 of hookswitch 40 is actuated. In this manner, ground from contact 30 is momentarily extended through hookswitch contact 41, line conductor X, the number 2 winding of relay 700, contact 715, contact 722, contact 731, through the winding of relay 740 to battery. Relay 700 of the transfer circuit operates, and through contact 701 operates relay 710. Relay 710 in operating at its contacts 716 and 717 places a shunt resistance $R_3$ in parallel with the number 2 winding of relay 700 and extends line conductor X through this parallel connection to conductor *a* of the cable pair leading to police switchboard 50. At its contacts 713 and 714 relay 710 places a shunt resistance $R_5$ in parallel with the number 1 winding of relay 700 and extends line conductor Y through this parallel connection to conductor *b* of the cable pair. It will be noted that the circuit through the number 1 winding of relay 700 now extends in the opposite direction through this winding, whereby relay 700 is held operated after the push button 1 has been released. A flashing lamp and an audible alarm (not shown) indicate to the police operator that a call isto be answered. Due to a substitute circuit now being closed over resistance $R_4$ and contact 712, the console in the fire department still maintains supervision without signalling an alarm. When the handset is replaced to the call box, transfer circuit 103B is restored.

From the foregoing description, it will be understood that due to the inclusion of hookswitch contact 41 in the circuit of the transfer contact 30, relay 700 cannot be operated if the push button is depressed only subsequently to the removal of the handset. If, on the other hand, the push button is depressed without removal of the handset, ground is extended from contact 30, to hookswitch contact 41, line conductor X, the number 2 winding of relay 700, contact 715, contact 722, contact 731, through the winding of relay 740 to battery to operate relay 700. Contact 701 operates relay 710, which as previously described, transfers conductors X and Y through transfer circuit 103B to conductors *a* and *b* at the police station to operate the aforementioned lamp and alarm as an indication to the police opertor that the push button has been depressed. Since this push button is assumed to be non-locking, the transfer circuit will be restored when the button is released. If subsequently, the handset is lifted at call box 103 by the same or a different user, the call thus initiated will therefore be received at the fire station rather than the police station. In this manner the circuit insures that a call made by the mere removal of the handset is turned in to the fire station even though transfer button 1 has previously been momentarily depressed. Thus fire calls are given preference over police calls. The latter type of call can be effectively made only if the user presses down the transfer button and does not release this button until the handset has been lifted from the cradle. The design of the hookswitch according to the present invention greatly facilitates this manipulation.

If the hook switch modification as shown in FIGS. 4, 5, and 6 is used in making a police call, the caller merely depresses the push button—it now remains depressed because it is locking—and lifts handset establishing a connection to the police department through the same circuit as described above. As will be understood from the above explanation of the latching mechanism, lifting of the handset unlocks the push button but not before ground is momentarily extended through contact 41 to operate relay 700. If through inadvertance, the push button is depressed without removal of the handset, the lamp and alarm at the police station will be operated. Since the button is locking, the lamp and alarm will remain operated until a subsequent caller lifts the handset, whereupon a talking circuit will be made to the police station. For this reason the locking modification can most advantageously be used at locations in which the need for police protection is greater than that of fire hazard protection.

While the invention has been described with reference to a particular environment, other applications will be readily apparent to those skilled in the art. The invention, therefore, should not be limited to the particular arrangement shown and described but should cover all modifications, within the spirit and scope of the claims.

What is claimed is:

1. In an emergency reporting telephone system, one or more call boxes; first and second emergency-report-receiving stations; a line connecting said call box to said stations; said call box having a hookswitch assembly comprising a frame, a hookswitch spring pileup and a transfer spring pileup both attached to said frame, a cradle carrying a handset and having a hub rotatably mounted on said frame so as to actuate said hookswitch spring pileup upon removal of said handset, and a push button, mounted for axial movement in said cradle hub, for actuating said transfer spring pileup; and means operated over said line in response to the actuation of said hookswitch spring pileup while said transfer spring pileup is in its unactuated position for initiating a call to said first station, and operated in response to the actuation of said hookswitch spring pileup while said transfer spring pileup is in its actuated position for initiating a call to said second station.

2. In an emergency reporting telephone system the combination as claimed in claim 1 wherein said hookswitch assembly also comprises; means for mechanically locking said push button in actuated position with said handset on said cradle, and means operated by said hookswitch upon removal of said handset from said cradle but effective only subsequent to actuation of said hookswitch spring pileup for releasing said locking means.

3. A hookswitch assembly comprising: a frame, a bearing member extending from said frame, a hookswitch spring pileup attached to said frame, a rod rotatably received in said bearing member and having a cradle attached to the outer end thereof and an arm attached to the inner end thereof for actuating said hookswitch pileup, an auxiliary spring pileup attached to said frame, and a pin received in said rod for longitudinal sliding motion and including an outer end having a manual push button attached thereto and an inner end for actuating said auxiliary pileup, such that when said push button is depressed, said pin moves inwardly until said inner end actuates said auxiliary pileup.

4. A hookswitch assembly as claimed in claim 3 and also comprising: a latching lever mounted on said arm and spring biased against said inner end of said pin, a projection on said inner end of said pin such that said lever slips thereunder when said push button is in its depressed position, locking said transfer spring pileup in its actuated position, and an adjustable member extending from said frame and adjusted to strike said lever when said hookswitch pileup is actuated so as to move said lever away from said pin allowing said pin to return to its outermost position, restoring said transfer spring pileup.

No references cited.